US006685975B2

(12) United States Patent
Saxby et al.

(10) Patent No.: US 6,685,975 B2
(45) Date of Patent: *Feb. 3, 2004

(54) PROCESS FOR RECOVERING BONE AND OIL FROM ANIMAL BYPRODUCTS

(75) Inventors: David J. Saxby, West Vancouver (CA); Gregar Saxby, West Vancouver (CA); Pedro Aloise, Vancouver (CA); Larry Leroux, Port Moody (CA)

(73) Assignee: Biozyme Systems Inc., Vancouver (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/574,368

(22) Filed: May 19, 2000

(65) Prior Publication Data

US 2003/0147994 A1 Aug. 7, 2003

(51) Int. Cl.⁷ .......................... A23L 1/325; C11B 13/00
(52) U.S. Cl. .................. 426/59; 426/417; 435/271; 554/8
(58) Field of Search .................. 554/18, 8; 452/10, 452/135–140, 115, 161, 134; 426/478, 479, 480, 486, 417, 56, 59; 435/271, 267

(56) References Cited

U.S. PATENT DOCUMENTS

| 2,158,918 A | 5/1939 | Townsend et al. |
| 3,041,174 A | 6/1962 | Ehlert |
| 3,249,442 A | 5/1966 | Keyes et al. |
| 4,961,936 A * | 10/1990 | Rubin ............................ 426/7 |
| 4,963,370 A * | 10/1990 | Uchida et al. ................. 426/7 |
| 4,981,711 A | 1/1991 | Kearns et al. |
| 5,374,428 A | 12/1994 | Hansen et al. |
| 5,474,790 A * | 12/1995 | Franklin et al. ............. 426/417 |

FOREIGN PATENT DOCUMENTS

| EP | 0951837 A1 | 10/1999 |
| GB | 461411 | 5/1935 |
| GB | 664827 | 6/1949 |
| JP | 58063797 | 10/1981 |

* cited by examiner

Primary Examiner—Keith Hendricks
(74) Attorney, Agent, or Firm—UREN, John Russell

(57) ABSTRACT

A processing method used for separating bone and oil from marine byproducts in the preparation of an endproduct. The byproducts are ground and then warmed to a relatively low temperature of approximately 70 deg.C. or less. The warmed material is passed to a refiner to separate the bone from the meat portions. The meat portion is transferred to a digestion tank where the endogenous enzymes perform a first stage digestion. Exogenous enzymes may be added and further digestion may take place for increased liquefaction of the meat portion. The exogenous enzymes can survive temperatures higher than the 60–65 deg.C. range so the liquified material can be heated during the further digestion to increase hydrolysis and pasteurize the product. Oil may be removed from the product by centrifuge following completion of either digesting step. Evaporation of the product may be used to increase the percentage of solid material. Alternatively, the oil may be removed after digestion without mechanically deboning the byproducts.

27 Claims, 1 Drawing Sheet

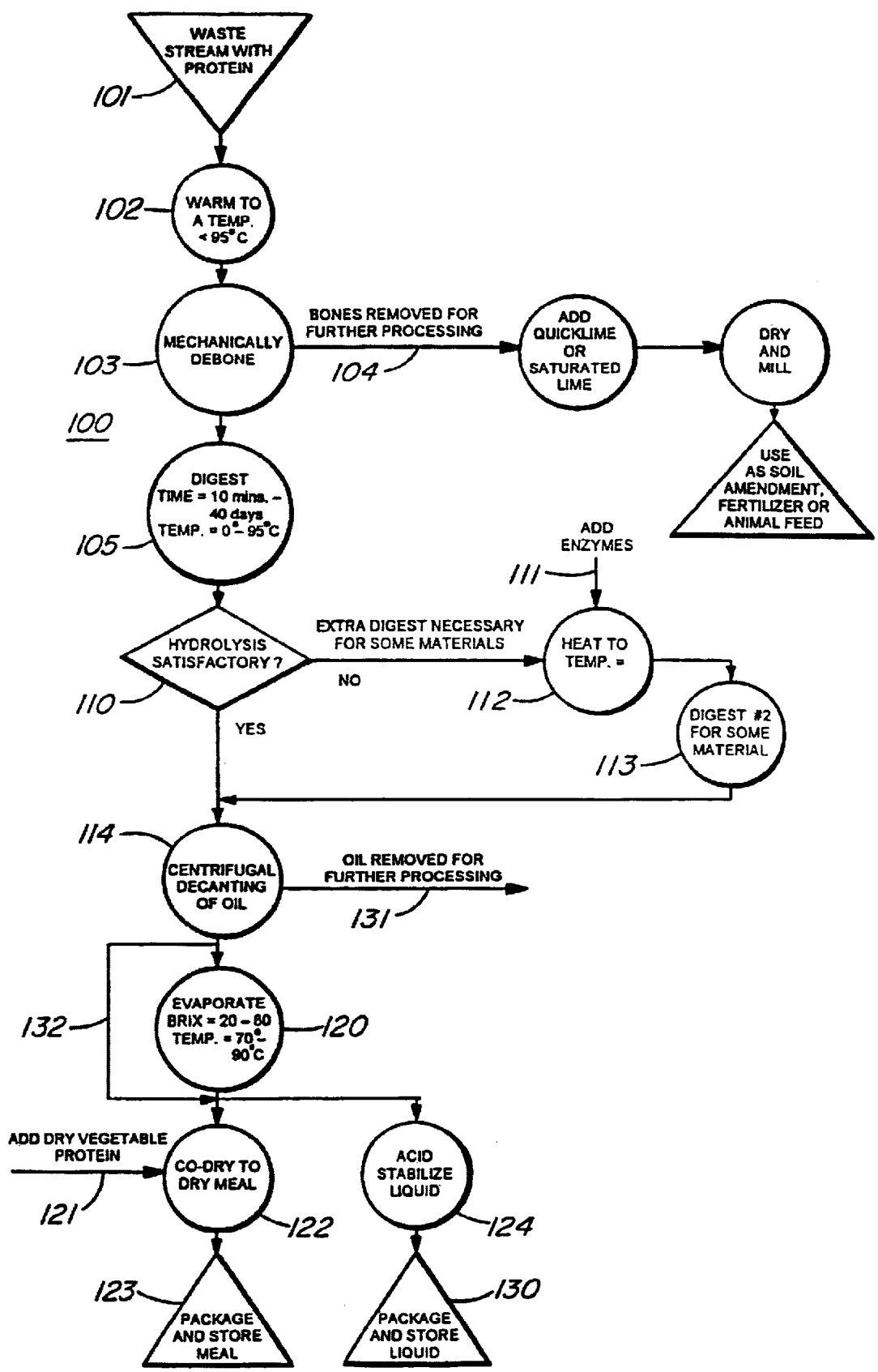

PROCESS FOR RECOVERING BONE AND OIL FROM ANIMAL BYPRODUCTS

INTRODUCTION

This invention relates to a method and apparatus for recovering bone and/or oil from animal byproducts and, more particularly, to a method for recovering oil and/or bone from marine byproducts using a relatively low temperature digestion process.

BACKGROUND OF THE INVENTION

In endproducts produced from animal byproducts, particularly marine byproducts, it may be desirable to remove the oil and/or bone from the byproducts during processing through to the endproduct. This is so because if the endproduct is a feed or food product or additive, the presence of bone will increase ash content which adversely affects nutritional value in some instances. In addition and in many cases with certain marine species, the presence of bone during digestion causes deposits in the digestion tank which are difficult to efficiently remove. Likewise, the presence of oil or a certain amount of oil in an endproduct such as an aquafeed may not be required or may not be required in quantities within the byproducts. The oil removed can be useful and valuable for other purposes.

In our U.S. Pat. No. 6,056,981 (May 2, 2000) and our co-pending U.S. applications Ser. Nos. 09/020,695 and 08/740,004, now U.S. Pat. No. 6,112,699, the contents of which are incorporated herein by reference, there are described certain advantages if the endogenous enzymes and other nutrients in marine related organisms can be used during hydrolysis by applying relatively carefully controlled conditions including lower temperatures so that the naturally occurring enzymes and other nutrients are not destroyed and which will allow the hydrolysis of the organisms to occur. It is contemplated that the natural hydrolysis of a marine organism may be superior to that caused by the artificial adding of exogenous enzymes.

A problem faced by the producers of endproducts using a base of marine byproducts is the removal of oil from the byproducts if the oil or a percentage of the oil is not needed in the endproduct, such as an aquafeed and which oil, when removed, may well be valuable for other purposes.

Many proposals have been made in attempting to efficiently and expediently extract oils from fish wastes. One technique disclosed in 1931 by Leim at the Atlantic Fisheries Experimental Station taught that freezing the livers of cod and pressing the livers thereafter would allow a greater quantity of oil to be obtained than when the livers were steamed resulting in oil coming to the surface and being skimmed therefrom. A further and somewhat unique proposal disclosed in U.S. Pat. No. 2,473,453 (Shropshire) taught that subjecting ground fish liver to a high power compression wave vibration would bring about the release of the oil. These techniques, however, did not contemplate any utility for the product following the removal of the oil.

Steaming the fish livers prior to the removal of oil has been contemplated as being beneficial because of the presence of active enzymes in the livers. These enzymes were seen as destroying the product unless they themselves were destroyed or inactivated. The method of destruction of the enzymes was to heat the product and/or the oils after extraction to relatively higher temperatures thereby inactivating the enzymes or causing "sterilization" of the enzymes. This high temperature process is used to the present date because it continues to be considered that the naturally occurring enzymes and other nutrients are not beneficial.

Therefore, present techniques for recovering bone and oil from marine byproducts generally utilise a high temperature process when the oil and/or the bone is separated from the other byproducts. The high temperatures cause destruction of the enzymes and other nutrients in the byproducts which could otherwise be useful as will be described hereafter.

A further problem with existing techniques is that if enzymatic digestion of the marine byproducts is allowed to take place, emulsification of the oils in the byproducts will occur. If oils emulsify, it is considered that the separation of the oils from the product is not possible. It has been found by the applicant, however, that carefully controlling the digestion time and the pH of the product during digestion and by maintaining a relatively low temperature of the product during the digestion step, it is quite possible to extract the oil by appropriate centrifugation following digestion.

SUMMARY OF THE INVENTION

According to one aspect of the invention, there is provided a method of removing oil from animal byproduct material comprising the steps of warming the temperature of said animal byproduct material to a temperature of less than 95 deg.C., digesting said animal byproduct material in a first digesting step to substantially liquify said animal byproduct material and centrifuging said animal byproduct material to remove said oil.

According to a further aspect of the invention, there is provided a method of removing bone from marine byproduct material comprising the steps of warming said ground marine byproduct material to a temperature less than 95 deg.C. and deboning said ground marine byproduct material.

According to still yet a further aspect of the invention, there is provided a method for recovering bone and oil from marine byproduct material comprising the steps of grinding said marine byproduct material to reduce the size of solids therein, warming said marine byproduct material to a temperature of less than 70 deg.C., deboning said warmed marine byproduct material, digesting said marine byproduct material to substantially liquify said marine byproduct material and centrifuging said marine byproduct material following said digestion to remove said oil.

According to yet a further aspect of the invention, there is provided products made from any of these methods.

BRIEF DESCRIPTION OF THE SEVERAL VIEWS OF THE DRAWINGS

A specific embodiment of the invention will now be described, by way of example only, with the use of drawings in which the FIGURE is a diagrammatic block diagram of the process used for separating bone and oil from the marine byproducts and forming the desired endproduct.

DESCRIPTION OF SPECIFIC EMBODIMENT

Referring now to the drawing, it will be understood that the separation from marine byproducts of bone and oil by way of a unique process are objectives of the present invention. It will also be understood that although the FIGURE illustrates the flow chart for both bone and oil removal, it is contemplated that either the bone or oil removal may be done independently.

The process according to the present invention is generally illustrated at 100 in the FIGURE. The process commences with the waste stream being selected at 101, the marine byproducts comprising the waste stream in the present instance. This wastestream is warmed to a temperature of less than 70 deg.C. at 102. The heated product then passes to a mechanical deboner 103 where the bone is removed for further processing at 104. The now deboned material passes to a digester 105 where the temperature, time and pH are carefully controlled.

The digested product is then tested at 110 to determine if the hydrolysis was satisfactory; that is, to ensure there is a minimal amount of undigested protein. If the hydrolysis was satisfactory, the product is then passed to a centrifugal decanting step 114. If the hydrolysis is not satisfactory, exogenous enzymes may be added at 111 and the product heated to a further and higher temperature at 112. The exogenous enzymes will resist destruction or inactivation at these higher temperatures and digestion will continue at 113. The further digested product then proceeds to a centrifugal decanting step 114 to remove the oil from the digested product. The oil may then be further processed at 131 as may be desired.

The product is then evaporated at 120 to a brix 20–80 at a temperature of 70 to 90 deg.C. if desired. Dry vegetable protein may be added at 121 and the product may then be co-dried at 122. The product is then packaged and stored at 123. Alternatively, the evaporation step 120 may be omitted with the product resulting from the removal of oil in the decanting step proceeding directly to either co-drying 122 or acid stabilization 124.

Further and alternatively, the liquid concentrate from the evaporation step 120 can be acid stabilised at 124 and then packaged and stored at 130.

In actual processing to date, satisfactory results have been obtained. Several are described in greater detail below:

EXAMPLE 1

The objective was to remove oil in the preparation of an aquafeed made from salmon viscera and the like. The composition of the raw material was approximately 10.9% protein, 18.2% fat, 63.0% liquid and 1.21% ash. 1.2 tons of salmon viscera was initially processed.

First, the material was ground subsequently to the grinding step, the ground material was passed through a heat exchanger to bring the temperature to between 50–55 deg.C. The warmed material was then passed to a digestion tank where it remains digesting from 30 minutes to 2 hours. Thereafter, 200 g. of papaine per ton of viscera was added and the mixture was again heated this time to 60–65 deg.C. The second digestion step was carried out for 1 to 4 hours with a controlled pH of 6.2 to 6.8 after which the material was run through a centrifugal decanter to recover the oil. The liquid portion was recovered separately and evaporated to 50% solids and acid stabilized using formic acid to pH 3.9. Part of the oil was barrelled directly and a further portion of the oil was processed to remove impurities using a centrifuge.

This produced a final evaporated hydrolysate having 29.9% protein, 5.7% fat, 57.4% moisture and 2.67% ash. The final oil parameters were FFA<10%, peroxide value<1, totox<1% and moisture<0.1%.

EXAMPLE 2

The objective was to process whole salmon and remove bone in the preparation of a feed product intended as a pig feed.

Two and one-third(2 ⅓) tons of whole chum salmon having a proximate composition of 16% protein, 1.6% fat, 80.4% moisture and 1.0% ash was initially treated.

The salmon was ground and heated to 55 deg.C. with a heat exchanger. The warmed material was pumped through a Brown refiner to separate the bone. The remaining meat portion was directed to a digestion tank where it was kept for approximately 1–2 hours at a controlled pH of approximately 6.6 to 7.2. Following this period, the contents of the digestion tank were re-heated to 62 deg.C. and 200 g/ton of papaine were added to the contents. Thereafter, the material was digested for an additional 2 ½ hours. Following the digestion, the liquid was acidified with formic acid to pH3.9 and the product was evaporated. The final product had a proximate composition of 40% protein, 4% fat, 50% moisture and 2.5% ash.

EXAMPLE 3

The objective was to process rockfish offal and remove bone and oil in the preparation of an aquafeed. Rockfish frames in the amount of 7–8 tons were initially processed and had a proximate composition of 14.3% protein, 7.7% fat, 71.8% moisture and 1.8% ash.

The raw material was collected from filleting lines and processed immediately while fresh. The offal was ground and heated to 65 deg. C. using a heat exchanger. The warmed material was pumped through a Brown refiner and the bone was separated. The meat was pumped directly to a centrifugal decanter to separate the oil. The liquid and solids fractions from the decanter were recombined and pumped into a digestion tank. The oil was further refined via centrifugation. The solid and liquid portions were remixed and 100–200 g of papaine per ton was added to the digest tank and the material was re-heated to 62 deg.C. The digestion thereafter was carried out for 4–16 hours at a controlled pH of 6.6 to 7.2. At the end of the digestion process, the material was screened through 16 mesh screen and the screened liquid was evaporated to 40–55% solids. The proximate composition of the final product was 32.0% protein, 6.5% fat, 57.5% moisture and 2.5% ash.

EXAMPLE 4

The objective was to process seven(7) to eight(8) tons of rock fish offal to remove bones and oil in the preparation of fertilizer. The proximate composition of the initial product was 14.3% protein, 7.7% fat, 71.8% moisture and 1.8% ash.

The raw material was collected from the filleting lines and processed immediately. The offal was ground and heated to 65 deg.C using a heat exchanger. The warmed material was pumped through a Brown refiner to separate the bone. The meat portion was directly pumped from the refiner to a centrifugal decanter to separate the oil. The liquid and solids fractions from the decanter were recombined and pumped into a digestion tank. A portion of the oil was further processed via centrifugation. 100–200 g. papaine per ton was added to the digestion tank and the product was re-heated to 62 deg.C. The digestion step was carried out for 4–16 hours at a controlled pH of 6.6 to 7.2. At the end of the digestion, the material was screened through a 60 mesh screen and the screened liquid was evaporated to 40% solids. The liquid product was supplemented with 60 Kg. of solid sulfate of potash (50%) per ton and stabilized to pH=3.5 with phosphoric acid. NPK values were N=4, P=2 and K=3.

EXAMPLE 5

The objective was to process seven(7) to eight(8) tons of stickwater for drip irrigation fertilizer. The stickwater had a proximate composition of protein 4.5%, fat 1.2%, moisture 88.5% and ash 0.8%.

The stickwater was warmed using a heat exchanger to 60–65 deg. C. The warmed material was transferred to a digestion tank and supplemented with 50–100 g. papaine/ton of material. The digestion step was carried out for 4–16 hours at a controlled pH of 6.6 to 7.2. The material at the end of the digestion step was screened through a 170 mesh screen and the screened liquid was evaporated to 40% solids. The liquid product was supplemented with 60 Kg of solid sulfate of potash (50%) per ton and stabilized to pH3.5 with phosphoric acid.

An analysis of the final product revealed 4% nitrogen, 1% potassium and 3% potassium.

The marine byproducts contemplated to be useful with the process according to the invention include but are not limited to all marine and fresh water fish, elasmobranches, hydrozoans, mollusks and crustaceans. It is further contemplated that the process according to the invention may be applicable to animal byproducts as well as marine byproducts.

Many modifications may be made in the process according to the invention. Although the time for the digestion process in the examples described extends from thirty(30) minutes to sixteen(16) hours, it is contemplate the process could be as short as ten(10) minutes and as long as forty(40) hours depending on the byproducts intended to be processed. Likewise, although the pH of the examples extends between 6.2 and 7.2, it is contemplated that the pH might range between 3.0 and 8.5, again depending on the conditions present, including the material being processed. Further, although the temperatures used as illustrative in the examples are 70 deg.C. or less, it is also contemplated that the digestion process could be carried out at somewhat higher temperatures, 95 deg.C. or less also being contemplated.

In respect of warming the product, it is noted that the warming temperature is generally 70 deg.C. or less with the usual marine byproduct wastestream. However, if the level of endogenous enzymes is deficient for normal digestion, exogenous enzymes may be added in which event, because the efficacy of such enzymes are more resistant to higher temperatures, the warming may take place to as high as 95 deg.C.

Many further modifications beyond those disclosed herein will readily occur to those skilled in the art to which the invention relates and the specific embodiments described should be taken as illustrative of the invention only and not as limiting its scope as defined in accordance with the accompanying claims.

We claim:

1. Method of removing oil from animal byproduct material, said method comprising the step of warming the temperature of said animal byproduct material to a temperature of less than 95 deg. C. and higher than 55 deg. C., incubating and digesting said animal byproduct material in a first incubating and digesting step using the naturally occurring endogenous proteolytic enzymes of said animal byproduct material to liquefy said animal byproduct material and centrifuging said liquefied animal byproduct material to remove said oil.

2. Method as in claim 1 wherein said animal byproduct material is marine byproduct material.

3. Method as in claim 2 wherein said marine byproduct material is warmed to a temperature of less than 70 deg.C.

4. Method as in claim 2 wherein said digesting of said marine byproduct material in said first digesting step is subject to a pH between 6.5 and 7.5 and said time for said digestion is between thirty (30) minutes and forty (40) hours.

5. Method as in claim 4 wherein said pH is controlled between 3.0 and 8.5.

6. Method as in claim 5 wherein said time extends between thirty (30) minutes and sixteen (16) hours.

7. Method as in claim 6 wherein said centrifuging of said oil is followed by cleaning and/or polishing of said oil to remove contaminants and additional water.

8. Method as in claim 7 wherein said marine byproduct material is ground before said warming.

9. Method as in claim 8 wherein said marine byproduct material is mechanically deboned following said warming.

10. Method as in claim 9 and further comprising subjecting said material to a second digesting step, adding exogenous enzymes during said second digesting step and increasing the temperature of said material during said second digesting step.

11. Method as in claim 9 and further comprising centrifugally decanting said oil following said second digesting step.

12. Method of removing bone from marine byproduct material comprising the steps of warming said marine byproduct material above the temperature of digestion naturally occurring in said marine byproduct material and which digestion utilises endogenous enzymes and occurs at a pH of above about 6.2 and at a pH of less that about 8.5, said marine byproduct material being warmed to a temperature of less than 95 deg. C. and higher than a temperature of 55 deg. C. and subsequently deboning said marine byproduct material.

13. Method as in claim 12 and further comprising grinding said marine byproduct material prior to said warming of said marine byproduct material.

14. Method as in claim 12 wherein said marine byproduct material is fish waste, whole fish and/or fish by-catch and said marine byproduct material is warmed to a temperature less than 70 deg. C.

15. Method as in claim 12 wherein said deboning is mechanical deboning.

16. Method for recovering bone and oil from marine byproduct material comprising the steps of grinding said marine byproduct material to reduce the size of solids therein, warming said marine byproduct material to a temperature greater than that wherein naturally occurring digestion takes place but less than 70 deg. C. and higher than 50 deg. C., deboning said warmed marine byproduct material, incubating and digesting said marine byproduct material in a first digesting step using the endogenous enzymes of said marine byproduct material to liquefy said marine byproduct material and centrifuging said marine byproduct material following said first digesting step to remove said oil.

17. Method as in claim 16 wherein said marine byproduct material is warmed to a temperature of less than 55 deg.C.

18. Method as in claim 17 and further comprising adding exogenous enzymes to said digested marine byproduct material, heating said material to a second temperature, digesting said material in a second digesting step and centrifuging said material to remove said oil.

19. Method as in claim 18 wherein said material is evaporated following said centrifugation of said product and removal of said oil.

20. Method as in claim 19 wherein dry vegetable protein is added to said material following said evaporation and said product is co-dried.

21. Method as in claim 19 wherein said material is acid stabilized following said evaporation.

22. Method as in claim 20 and further comprising packaging and storing said material.

23. Method as in claim 21 and further comprising packaging and storing said acid stabilised material.

24. Method as in claim 4 wherein said time for said first digestion step is between thirty (30) minutes and sixteen (16) hours.

25. Method as in claim 7 wherein said cleaning and/or polishing of said oil is a second centrifugation step to remove water and other contaminants from said removed oil.

26. Method as in claim 12 and further comprising adding exogenous enzyme to said marine byproduct material.

27. Method as in claim 26 wherein said exogenous enzymes are commercially available proteolytic enzyme.

* * * * *